US008687847B2

(12) United States Patent
Hattori

(10) Patent No.: US 8,687,847 B2
(45) Date of Patent: Apr. 1, 2014

(54) IMAGE PROCESSING APPARATUS AND CONTROL METHOD THEREFOR

(75) Inventor: Mitsuaki Hattori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/306,381

(22) Filed: Nov. 29, 2011

(65) Prior Publication Data

US 2012/0140985 A1 Jun. 7, 2012

(30) Foreign Application Priority Data

Dec. 7, 2010 (JP) .................................. 2010-273017

(51) Int. Cl.
G06K 9/00 (2006.01)
(52) U.S. Cl.
USPC ....................................................... 382/103
(58) Field of Classification Search
None
See application file for complete search history.

(56) References Cited

U.S. PATENT DOCUMENTS

| 7,623,161 | B2 * | 11/2009 | Hattori | 348/224.1 |
| 2011/0150280 | A1 * | 6/2011 | Tsuji | 382/103 |
| 2012/0092523 | A1 * | 4/2012 | Nakamura | 348/224.1 |
| 2012/0274724 | A1 * | 11/2012 | Cross et al. | 348/14.1 |

FOREIGN PATENT DOCUMENTS

| JP | 2002-047590 | 8/2002 |
| JP | 2002-247590 | 8/2002 |

* cited by examiner

*Primary Examiner* — Vu Le
*Assistant Examiner* — Samah Beg
(74) *Attorney, Agent, or Firm* — Cowan, Liebowitz & Latman, P.C.

(57) ABSTRACT

A parameter for each of a plurality of images captured in time series is computed based on information obtained from the image, and a normal reference image (an image captured before an image targeted for processing is stored). A degree of similarity between the image targeted for processing and the normal reference image is computed, and a parameter to be used in image processing applied to the image targeted for processing is computed by performing weighted addition such that a parameter computed from the normal reference image has a higher weight than a parameter computed from the image targeted for processing the higher the degree of similarity.

4 Claims, 6 Drawing Sheets

F I G. 5

| CAPTURED FRAME | SUBJECT REFERENCE IMAGE B | NORMAL REFERENCE IMAGE B | DEGREE OF SIMILARITY B/W SUBJECT REFERENCE IMAGE B & CURRENT IMAGE | DEGREE OF SIMILARITY B/W NORMAL REFERENCE IMAGE B & CURRENT IMAGE | WHITE BALANCE CORRECTION VALUE COMPUTED ONLY FROM CURRENT IMAGE | WHITE BALANCE CORRECTION VALUE APPLIED TO CURRENT IMAGE |
|---|---|---|---|---|---|---|
| 1ST FRAME (301) | — | — | 0% | 0% | Rgain = ×2.0<br>Ggain = ×1.0<br>Bgain = ×2.0 | Rgain = ×2.0<br>Ggain = ×1.0<br>Bgain = ×2.0 |
| 2ND FRAME (302) | — | 1ST FRAME (301) | 0% | 100% | Rgain = ×2.2<br>Ggain = ×1.0<br>Bgain = ×1.8 | Rgain = ×2.0<br>Ggain = ×1.0<br>Bgain = ×2.0 |
| 3RD FRAME (303) | — | 1ST FRAME (301) | 0% | 80% | Rgain = ×2.4<br>Ggain = ×1.0<br>Bgain = ×1.6 | Rgain = 2.0 × 0.8 + 2.4 × 0.2 = ×2.1<br>Ggain = 1.0 × 0.8 + 1.0 × 0.2 = ×1.0<br>Bgain = 2.0 × 0.8 + 1.6 × 0.2 = ×1.9 |
| 4TH FRAME (304) | — | 1ST FRAME (301) | 0% | 60% | Rgain = ×2.6<br>Ggain = ×1.0<br>Bgain = ×1.4 | Rgain = 2.0 × 0.6 + 2.6 × 0.4 = ×2.2<br>Ggain = 1.0 × 0.6 + 1.0 × 0.4 = ×1.0<br>Bgain = 2.0 × 0.6 + 1.4 × 0.4 = ×1.8 |
| 5TH FRAME (305) | — | 1ST FRAME (301) | 0% | 40% | Rgain = ×2.8<br>Ggain = ×1.0<br>Bgain = ×1.2 | Rgain = 2.0 × 0.4 + 2.8 × 0.6 = ×2.5<br>Ggain = 1.0 × 0.4 + 1.0 × 0.6 = ×1.0<br>Bgain = 2.0 × 0.4 + 1.2 × 0.6 = ×1.5 |
| 6TH FRAME (306) | — | 1ST FRAME (301) | 0% | 20% | Rgain = ×3.0<br>Ggain = ×1.0<br>Bgain = ×1.0 | Rgain = 2.0 × 0.2 + 3.0 × 0.8 = ×2.8<br>Ggain = 1.0 × 0.2 + 1.0 × 0.8 = ×1.0<br>Bgain = 2.0 × 0.2 + 1.0 × 0.8 = ×1.2 |

F I G. 6

| CAPTURED FRAME | SUBJECT REFERENCE IMAGE B | NORMAL REFERENCE IMAGE B | DEGREE OF SIMILARITY B/W SUBJECT REFERENCE IMAGE B & CURRENT IMAGE | DEGREE OF SIMILARITY B/W NORMAL REFERENCE IMAGE B & CURRENT IMAGE | WHITE BALANCE CORRECTION VALUE COMPUTED ONLY FROM CURRENT IMAGE | WHITE BALANCE CORRECTION VALUE APPLIED TO CURRENT IMAGE |
|---|---|---|---|---|---|---|
| 1ST FRAME (403) | — | — | 0% | 0% | Rgain = ×2.0<br>Ggain = ×1.0<br>Bgain = ×2.0 | Rgain = ×2.0<br>Ggain = ×1.0<br>Bgain = ×2.0 |
| 2ND FRAME (404) | 1ST FRAME (403) | 1ST FRAME (403) | 0% | 0% | Rgain = ×2.4<br>Ggain = ×1.0<br>Bgain = ×1.6 | Rgain = ×2.4<br>Ggain = ×1.0<br>Bgain = ×1.6 |
| 3RD FRAME (405) | 1ST FRAME (403) | 2ND FRAME (404) | 100% | 0% | Rgain = ×1.6<br>Ggain = ×1.0<br>Bgain = ×2.4 | Rgain = ×2.0<br>Ggain = ×1.0<br>Bgain = ×2.0 |

IMAGE PROCESSING APPARATUS AND CONTROL METHOD THEREFOR

BACKGROUND OF THE INVENTION

1. Field of the Invention

The present invention relates to an image processing apparatus and a control method therefor, and more particularly to an image processing apparatus for performing white balance correction on captured images and a control method therefor.

2. Description of the Related Art

Heretofore, image capturing apparatuses such as digital still cameras, for example, have been provided with an automatic white balance function for automatically performing white balance correction on captured images. In order to reduce variation in white balance correction results of continuously captured images, application of a white balance correction value computed based on the image captured in the first frame (first image) to the second frame (second image) onward during continuous shooting is known.

However, in the case where the color temperature of light illuminating the subject during continuous shooting changes, this method may result in the color of images captured before and after the change being different. In order to solve this problem, Japanese Patent Laid-Open No. 2002-247590 (Literature 1) discloses a technique that involves measuring the luminance of the subject for every image obtained by continuous shooting, and computing a new white balance correction value according to the amount of change between the luminance of the subject in the image of the previous frame and the luminance of the subject in the image of the current frame.

With the technique described in Literature 1, if the color temperature of light illuminating the subject does not change during continuous shooting (little change in luminance), the white balance correction value applied to the image of the previous frame is applied to the image of the current frame. Thus, variation in the white balance correction results of continuously captured images can be reduced. If the color temperature of light illuminating the subject changes during continuous shooting (significant change in luminance), a white balance correction value computed based only on the image of the current frame is applied to the image of the current frame. Thus, even if the color temperature of light illuminating the subject changes between shooting of the previous frame and the current frame, an appropriate white balance correction result is obtained for the image of the current frame.

However, in the technology disclosed by Literature 1, an appropriate automatic white balance correction result may not be obtained in the following two examples.

The first example is where the image capturing area gradually changes from a sunny area to a shaded area during continuous shooting such as shown in FIG. 3. Reference numeral 301 denotes the image capturing area of the first frame at the time of continuous shooting, and 302 to 306 respectively the image capturing areas of the second to sixth frames at the time of continuous shooting. In the case where the proportion of the area that a plurality of light sources occupies in the captured images gradually changes in this manner, there is little change in luminance between the current frame and the previous frame. Thus, change in the light sources cannot be appropriately detected with the method of Literature 1. As a result, the white balance correction value for the sunny area computed with the first frame 301 is used sequentially, and even ends up being used for shooting the shaded area of the sixth frame 306.

The second example is where the state of a person in continuously captured images changes such as shown in FIG. 4A and FIG. 4B, in an image capturing apparatus that has a face detection function and performs white balance correction so as to achieve an appropriate facial skin color when a face is detected. Reference numerals 401 and 402 denote the same scene, and 403 to 405 the image capturing areas of the first to third frames. The person is facing the front in scene 401, whereas the person has turned to the side in scene 402.

Here, since the person appears facing the front in the first frame 403, face detection detects the person's face. Automatic white balance correction to achieve an appropriate facial skin color is executed on the basis of color information of the detected face. A more accurate white balance correction result than the case where face detection is not performed can thereby be obtained.

Since the area captured in the second frame 404 is completely different from the first frame 403, with sky notably being included in the area, there is a significant change in luminance from the first frame 403. Accordingly, with the method described in Literature 1, white balance correction of the second frame 404 is performed based only on the image of the second frame.

When the same image capturing area as the first frame 403 is again captured in the third frame 405, white balance correction on the third frame 405 is executed also based only on the image of the third frame 405, since there is a significant change in luminance from the second frame 404. Here, it is assumed that the person's face could not be detected in the third frame 405, since the person was facing to the side. In this case, unlike the first frame 403 in which the person's face could be detected, white balance correction is performed in the third frame 405 without using the color information of the face.

As a result, the white balance correction values of the first frame 403 obtained using the color information of the face and the third frame 405 obtained without using the color information of the face will differ, resulting in images with different hues despite the image capturing areas of the first frame 403 and the third frame 405 being substantially the same.

SUMMARY OF THE INVENTION

The present invention is made in view of the problems with such conventional techniques, and provides, as one aspect of the invention, an image processing apparatus capable appropriately correcting a plurality of images captured in time series by stabilizing the tone thereof and a control method therefor.

According to one aspect of the present invention, there is provided an image processing apparatus for computing a parameter to be used in image processing applied to each of a plurality of images captured in time series, comprising: a parameter computation unit that computes the parameter for each of the plurality of images based on information obtained from the image; a storage unit that stores, as a normal reference image, an image captured before an image targeted for processing; a similarity computation unit that computes a degree of similarity between the image targeted for processing and the normal reference image, from a predetermined feature obtained from the respective images; and a control unit that computes a parameter to be used in image processing applied to the image targeted for processing, by performing weighted addition of a parameter computed from the image targeted for processing and a parameter computed from the normal reference image, such that the parameter computed from the normal reference image has a higher weight the higher the degree of similarity, wherein the storage unit is updated such that the image targeted for processing serves as a new normal reference image, in a case where the degree of similarity is less than or equal to a predetermined degree of similarity.

According to another aspect of the present invention, there is provided an image processing apparatus for computing a parameter to be used in image processing applied to each of a plurality of images captured in time series, comprising: a detection unit that detects a predetermined subject from an image; a similarity computation unit that computes a degree of similarity between two images, from a predetermined feature obtained from the respective images; a parameter computation unit that computes the parameter for each of the plurality of images based on information obtained from the image; a storage unit that stores a subject reference image determined from an image in which the predetermined subject is detected and a normal reference image determined from an image in which the predetermined subject is not detected, out of images captured before an image targeted for processing; and a control unit, wherein the control unit computes a third parameter, by performing weighted addition of a first parameter computed by the parameter computation unit from the subject reference image and a second parameter computed by the parameter computation unit from the image targeted for processing, such that the parameter computed from the image with respect to which a degree of reliability of the subject detected by the detection unit is higher, out of the subject reference image and the image targeted for processing, has a higher weight, and computes a parameter to be used in image processing applied to the image targeted for processing, by performing weighted addition of a fourth parameter computed by the parameter computation unit from the normal reference image and the third parameter, such that the fourth parameter has a higher weight the higher the degree of similarity between the normal reference image and the image targeted for processing computed by the similarity computation unit.

According to still another aspect of the present invention, there is provided a control method for an image processing apparatus that computes a parameter to be used in image processing applied to each of a plurality of images captured in time series, comprising: a parameter computation step of computing the parameter for each of the plurality of images based on information obtained from the image; a storage step of storing, as a normal reference image, an image captured before an image targeted for processing into a storage unit; a similarity computation step of computing a degree of similarity between the image targeted for processing and the normal reference image, from a predetermined feature obtained from the respective images; a control step of computing a parameter to be used in image processing applied to the image targeted for processing, by performing weighted addition of a parameter computed from the image targeted for processing and a parameter computed from the normal reference image, such that the parameter computed from the normal reference image has a higher weight the higher the degree of similarity; and an update step of updating the storage unit such that the image targeted for processing serves as a new normal reference image, in a case where the degree of similarity is less than or equal to a predetermined degree of similarity.

According to still another aspect of the present invention, there is provided a control method for an image processing apparatus that computes a parameter to be used in image processing applied to each of a plurality of images captured in time series, the image processing apparatus including: a detection unit that detects a predetermined subject from an image; a similarity computation unit that computes a degree of similarity between two images, from a predetermined feature obtained from the respective images; a parameter computation unit that computes the parameter for each of the plurality of images based on information obtained from the image; and a storage unit that stores a subject reference image determined from an image in which the predetermined subject is detected and a normal reference image determined from an image in which the predetermined subject is not detected, out of images captured before an image targeted for processing, and the control method for the image processing apparatus comprising the steps of: computing a third parameter, by performing weighted addition of a first parameter computed by the parameter computation unit from the subject reference image and a second parameter computed by the parameter computation unit from the image targeted for processing, such that the parameter computed from the image with respect to which a degree of reliability of the subject detected by the detection unit is higher, out of the subject reference image and the image targeted for processing, has a higher weight, and computing a parameter to be used in image processing applied to the image targeted for processing, by performing weighted addition of a fourth parameter computed by the parameter computation unit from the normal reference image and the third parameter, such that the fourth parameter has a higher weight the higher the degree of similarity between the normal reference image and the image targeted for processing computed by the similarity computation unit.

Further features of the present invention will become apparent from the following description of exemplary embodiments with reference to the attached drawings.

BRIEF DESCRIPTION OF THE DRAWINGS

FIG. 5 is a diagram illustrating operation of the image capturing apparatus according to the embodiment of the present invention in the example of FIG. 3.

FIG. 6 is a diagram illustrating operation of the image capturing apparatus according to the embodiment of the present invention in the example of FIG. 4A and FIG. 4B.

DESCRIPTION OF THE EMBODIMENTS

Figure 1:
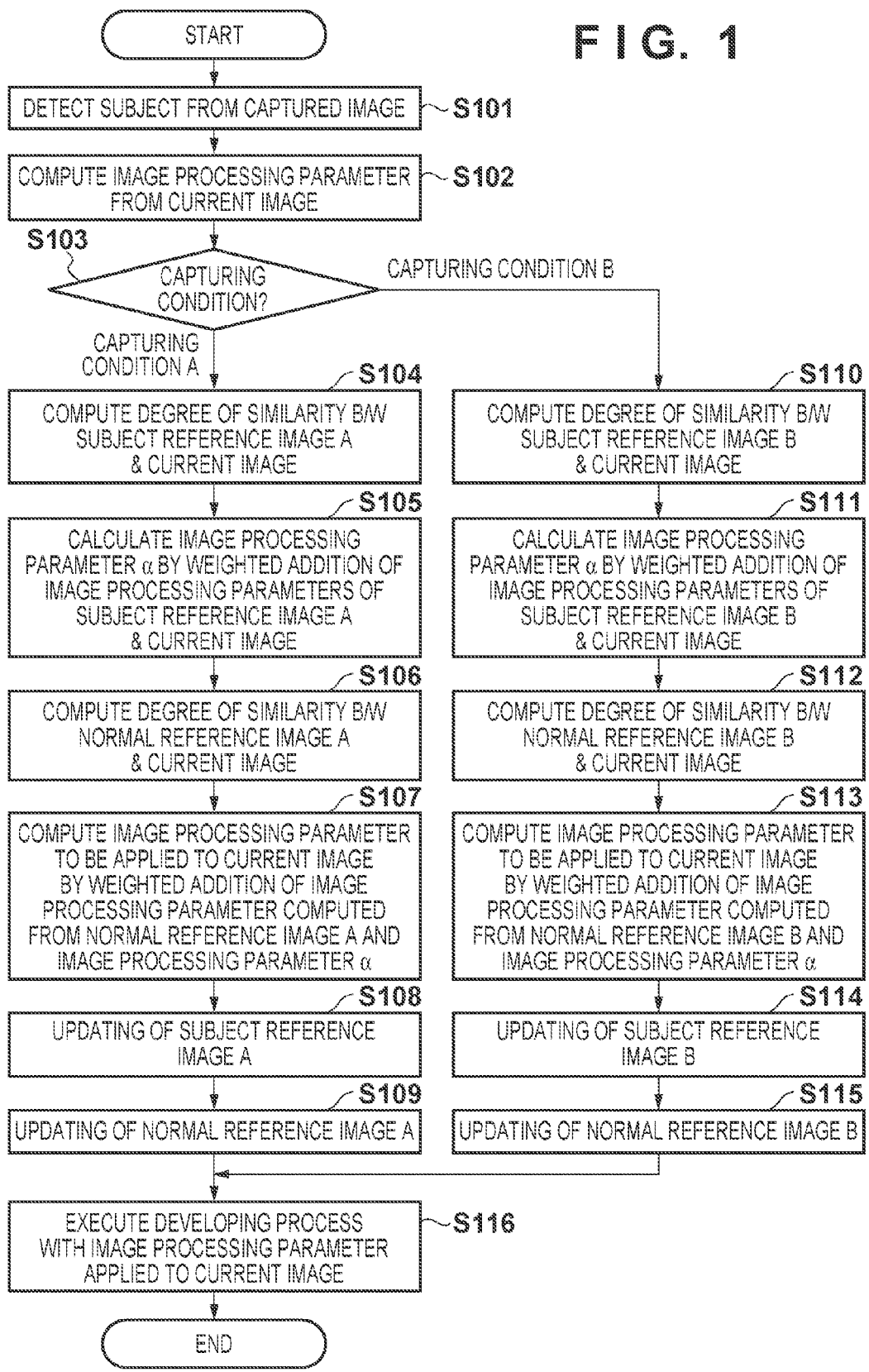
FIG. 1 is a flowchart illustrating operation of an image capturing apparatus serving as one example of an image processing apparatus according to an embodiment of the present invention.

Exemplary embodiments of the present invention will now be described in detail in accordance with the accompanying drawings. Note that each of functional blocks such as a "unit" and a "section" in the drawings can be realized by hardware (i.e., discrete circuits, an ASIC, programmable logic devices, etc.), software (i.e., a combination of software and a processor such as a CPU and a MPU that executes the software), or a combination thereof. Also note that a plurality of the functional blocks can be realized by a single hardware entity.

Figure 2:
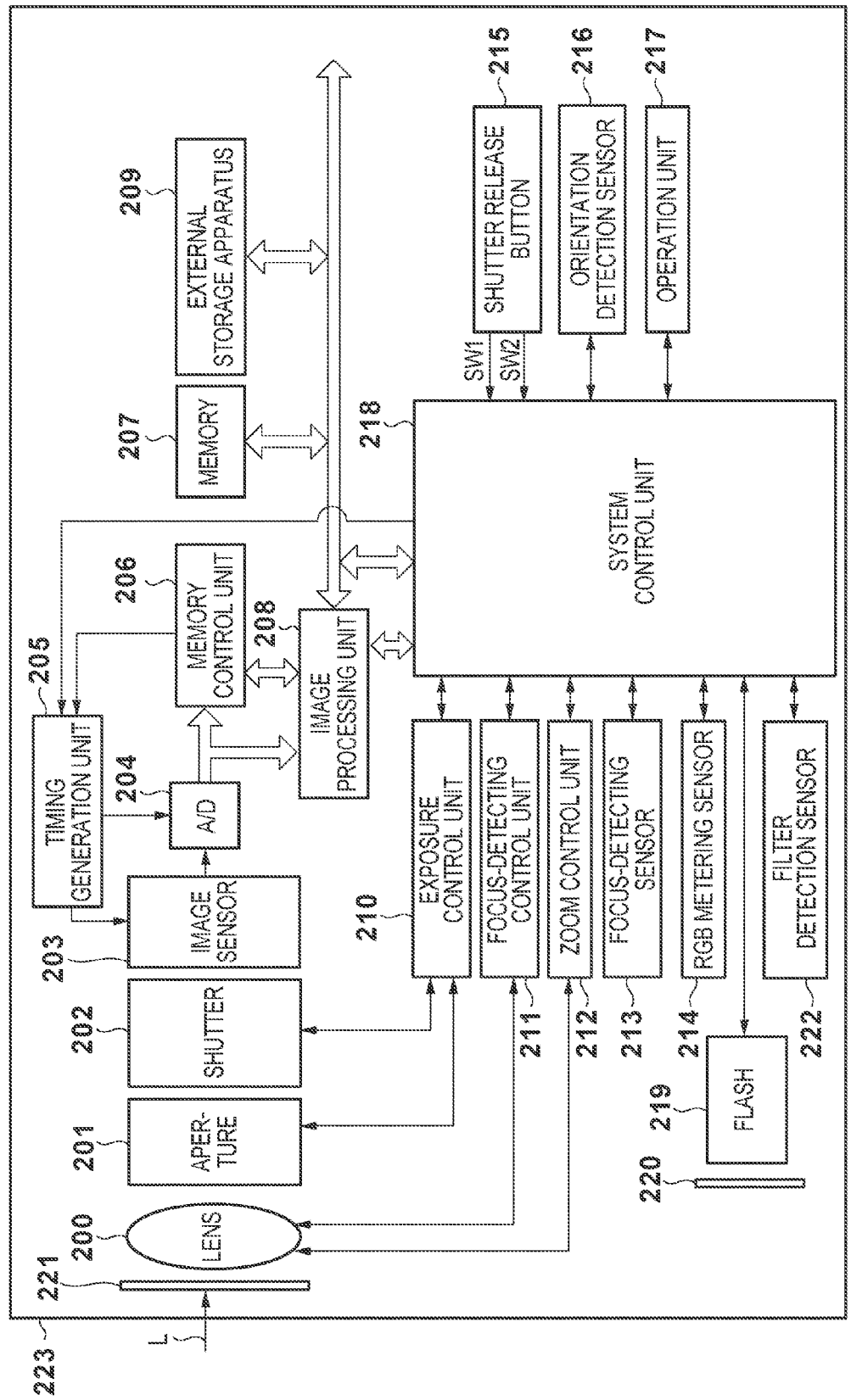
FIG. 2 is a block diagram showing an example configuration of the image capturing apparatus according to the embodiment of the present invention.

FIG. 2 is a block diagram showing an example configuration of an image capturing apparatus serving as an example of an image processing apparatus according to the embodiment of the present invention. Note that the configuration (lens, image sensor, etc.) concerning image capture is not essential to the present invention, and the invention is applicable to an arbitrary apparatus capable of processing images obtained through image capture.

In FIG. 2, reference numeral 200 denotes a shooting lens that is removable from an image capturing apparatus 223, 201 an aperture, 202 a shutter, 203 an image sensor that converts an optical image into an electrical signal, and 204 an A/D convertor that changes analog signal output of the image sensor 203 into digital data. A timing generation unit 205 supplies a clock signal and a control signal to the image sensor 203 and the A/D convertor 204, and controls operation thereof. This timing generation unit 205 is controlled by a memory control unit 206 and a system control unit 218.

The image processing unit 208 applies various types of image processing to data from the A/D convertor 204 and image data from the memory control unit 206. The image processing includes white balance correction, color interpolation for converting Bayer signals into three RGB plane signals, gamma correction, color correction, sharpness enhancement, noise reduction, and the like. The image processing unit 208 also performs subject detection for detecting a specific subject by analyzing image data. Subject detection also includes the above-mentioned face detection. Note that there is no particular restriction on the method of face detection performed by the image processing unit 208, and any known method can be applied. Also, the subject targeted for detection is not limited to a human face, and a configuration may be adopted in which one or more of the following are detected, including an animal, a plant, an architectural structure, a vehicle, food, the sky, the ground, clouds, a mountain, a river, the sea, a heavenly body, fireworks, snow, text, and an artwork. There is also no particular restriction on the method of detecting these individual subjects, and features of these subjects that are detectable from an image are registered in advance, and respective subjects can be detected through similarity with features obtained from a captured image.

The image processing unit 208 reflects information on the detected subject in computation of the parameters of image processing such as white balance correction, brightness correction, contrast correction, color correction, sharpness enhancement and noise reduction. While the way in which information on a subject is reflected in computation of image processing parameters can be freely determined, normally image processing parameters are computed so that the hue and brightness of the detected subject fall within an appropriate predetermined range.

Also, the image processing unit 208 computes image processing parameters to be applied to the current captured image (current image) by performing weighted combination of image processing parameters computed for the current image and image processing parameters corresponding to a reference image selected from past captured images. This processing will be illustrated in detail later.

The image processing unit 208 also computes luminance histograms or RGB histograms of the image, and average RGB values or average luminance values for the image as a whole. These are used when comparing the current image and a reference image. This processing will also be discussed later.

The memory control unit 206 controls the A/D convertor 204, the timing generation unit 205, the image processing unit 208, and a memory 207. Digital data output by the A/D convertor 204 is thereby written to the memory 207 via at least the memory control unit 206, out of the image processing unit 208 and the memory control unit 206.

The memory 207 is for temporarily storing captured images, and is provided with sufficient storage capacity to store a predetermined number of still images. It is also possible to use the memory 207 as a work area of the system control unit 218 and the image processing unit 208.

An external storage apparatus 209 is a removable recording medium typified by a memory card. Image data temporarily stored in the memory 207 is ultimately recorded in the external storage apparatus 209, after encoding or the like has been performed if required.

An RGB metering sensor 214 is an external sensor that is able to measure the color and luminance of a subject within the image capturing area on a pixel-by-pixel basis. The system control unit 218 determines the light exposure at the time of image capture (shutter speed and aperture value) according to the output of the RGB metering sensor 214. The exposure control unit 210 drives the aperture 201 and the shutter 202 according to the light exposure.

A focus-detecting sensor 213 detects subject distance information. A focus-detecting control unit 211 controls a focus detection operation of the lens 200 using the output of the focus-detecting sensor 213.

A zoom control unit 212 performs detection of the amount of zoom when the lens 200 has been manually zoomed by operation of a lens zoom ring or the like, control of the lens zoom amount in the case where a zoom key included in an operation unit 217 of a camera is operated, and the like.

A orientation detection sensor 216 is a sensor that detects the horizontal/vertical deflection of the image capturing apparatus 223, and is used for determining whether shooting is performed in a vertical position or a horizontal position, and the like.

The system control unit 218 controls operation of the entire image capturing apparatus 223. The system control unit 218 has, for example, a microprocessor, a ROM storing control program, and a RAM used as a work area. Functions of the image capturing apparatus 223, including operations that will be discussed later, are realized by the microprocessor executing programs read out from the ROM to the RAM.

SW1 is a switch that is turned on with a first stroke (e.g., half press) of a shutter release button 215, and starts light metering and focus detecting. SW2 is a switch that is turned on with a second stroke (e.g., full press) of the shutter release button 215, and starts an exposure operation.

A flash 219 is an auxiliary light source for illuminating a subject at the time of shooting that is removable from the image capturing apparatus 223. The flash 219 is provided with a normal flash mode and a high-speed sync flash mode. Further, it is also possible to perform bounce flash shooting by changing a lighting angle.

An optical flash filter 220 can also be attached to the front of the flash 219. Examples of the optical flash filter 220 include a diffusion filter that diffuses the flash light and a color temperature conversion filter that changes the color temperature of the flash light.

It is also possible to attach an optical lens filter 221 to the front of the lens 200. Examples of the optical lens filter 221 include a color temperature conversion filter and a polarizing filter.

A filter detection sensor 222 detects the type of optical lens filter 221 and optical flash filter 220. While there is no particular restriction on the filter detection method, the simplest method is for the user to input the type of filter that is attached through the operation unit 217, and for the input content thereof to be detected.

Next, the image processing operation performed after image capture by the image capturing apparatus 223 in the present embodiment will be described, with reference to the flowchart in FIG. 1.

For example, when exposure is performed as a result of the shutter release button 215 having been fully pressed, an analog signal corresponding to a subject image is output on a pixel-by-pixel basis from the image sensor 203. This analog signal is converted into 12-bit digital data by the A/D convertor 204, and sent to the image processing unit 208 as image data.

The image processing unit 208 analyzes this 12-bit image data, and detects the subject, in this case a person. Here, "person" denotes not only the subject's face but also his or her whole body. The subject that is detected is not limited to a person, and a configuration may be adopted in which one or more of the following is detected, including an animal, a plant, an architectural structure, a vehicle, food, the sky, the ground, clouds, a mountain, a river, the sea, a heavenly body, fireworks, snow, text, and an artwork. Here, "animal" denotes a cat, a dog, or the like. "Plant" denotes lawn, a tree, a flower, or the like. "Architectural structure" denotes structures such as a house or building, a bridge, a road, or the like. "Vehicle" denotes a car, a motorbike, a bicycle, a plane, a train, or the like. "Food" denotes food on a plate, a drink, an ordinary fruit such as an apple or a banana, meat, fish, or the like. "Sky" denotes a blue sky, a cloudy sky, a sunset (sunrise), a night sky, or the like. "Ground" denotes soil, lawn, sand, or the like. "Clouds", "mountain", "river" and "sea" are self-explanatory. "Heavenly body" denotes the stars, the moon, the sun, or the like. "Fireworks" denotes fireworks that are launched, handheld fireworks, or the like. "Snow" denotes a snowy landscape such as a snow-covered mountain, or the like. "Text" denotes the characters or numbers of a book or the like. "Artwork" denotes a painting, a statue or the like.

Subject detection is, in the case of human detection, for example, performed by storing a facial pattern in the memory 207 in advance, and using a known pattern matching technique or the like to analyze whether a subject that matches or has a high degree of similarity with that pattern is included in the image. Detection is also performed using a pattern matching technique or the like for the other subjects. The position, size, color, area, degree of reliability and the like of the subject within the image are obtained as the detection result. Here, the degree of reliability is an index of the probability of the subject being a subject that should be detected, and the probability of being a subject that should be detected is higher the higher the degree of reliability.

Next, the image processing unit 208, in S102, computes image processing parameters from a captured image. In the present embodiment, "image processing parameters" denote parameters used in white balance correction, brightness correction, contrast correction, color correction, noise reduction, and sharpness enhancement. Example computation of respective image processing parameters in the case where human detection is used as subject detection will be described hereinafter.

Note that in the present embodiment, image processing is performed in order of white balance correction, brightness correction, contrast correction, color correction, noise reduction, and sharpness enhancement.

First, example computation of parameters for white balance correction will be described.

For example, if a face could not be detected in subject detection, all the pixel data of the captured image is integrated for each of the R, G and B data types, and the respective correction values are computed using Equation 1.

$$R \text{ correction value} = G \text{ integration value}/R \text{ integration value}$$

$$G \text{ correction value} = 1$$

$$B \text{ correction value} = G \text{ integration value}/B \text{ integration value} \quad (1)$$

In the case where a human detection result is obtained in subject detection, 12-bit RGB data corresponding to the person's facial region is obtained. Parameters for white balance correction are then computed using an appropriate white balance correction value reference table corresponding to these 12-bit RGB values and each piece of 12-bit skin-color RGB data. Note that a white balance correction value reference table corresponding to each skin color is computed beforehand, and is recorded in the memory 207.

Next, an example computation of the brightness correction parameter will be described.

In the case where a face is detected in subject detection, the image processing unit 208 computes the gain to be applied to each piece of 12-bit RGB data as a brightness correction parameter, such that the facial brightness achieves a target brightness. In the case where a face is not detected in subject detection, the image processing unit 208 computes, as a brightness correction parameter, gains that result in the average RGB values for the entire captured image achieving the target brightness. Note that the facial brightness target values and the brightness target values of the average RGB integration values for the entire image in the case where a face is not detected are computed in advance and recorded in the memory 207.

Next, an example computation of the contrast correction parameter will be described.

Contrast correction also serves as gamma correction for converting 12-bit RGB data into 8-bit RGB data. Also, color interpolation using a known technique for converting RGB Bayer signals into three RGB plane signals is performed prior to contrast correction.

A standard gamma curve and a plurality of gamma curves corresponding to each facial brightness value are recorded beforehand in the memory 207.

If a face could not be detected in subject detection, the image processing unit 208 selects the standard gamma curve in the memory 207. If a face could be detected in subject detection, the image processing unit 208 selects the gamma curve corresponding to the brightness of the detected face from the memory 207.

Note that processing for appropriately correcting facial brightness if a face could be detected may be performed by either brightness correction or contrast correction.

Next, an example computation of the color correction parameter will be described.

In color correction, the hue, saturation and brightness of arbitrary colors are corrected by applying a three-dimensional look-up table (hereinafter, 3D LUT) that has 33×33×33 RGB grid points to the contrast-corrected 8-bit RGB data. Note that although the 3D LUT has 33×33×33 grid points in the present embodiment, there may be any number of grid points. A 3D LUT serving as a standard tone and a plurality of 3D LUTs with lower saturation and higher brightness for skin color than the standard tone 3D LUT (e.g., 3D LUTs designed to reduce saturation the higher the color saturation of a detected face) are recorded in the memory 207 beforehand for each color of a detected face.

If a face could not be detected in subject detection, the image processing unit 208 selects the standard reference 3D LUT recorded in the memory 207. If a face could be detected in subject detection, the image processing unit 208 selects a corresponding 3D LUT from the memory 207, according to the saturation of the color of the detected face.

Next, an example computation of the noise reduction parameter will be described.

Noise reduction, for example, involves performing, on each pixel, processing for replacing a pixel of interest targeted for processing with a pixel having an average value of the RGB data of N (N being integer) pixels on the left, right, above and below the pixel of interest. Note that the N pixels on the left, right, above and below the pixel of interest are provided as noise reduction parameters, and the noise reduction effect is greater the larger the value of N.

A normal noise reduction parameter and a parameter having a greater noise reduction effect than normal are recorded in the memory 207 beforehand.

If a face could not be detected in subject detection, the image processing unit 208 selects the standard noise reduction parameter recorded in the memory 207. If a face could be detected in subject detection, the image processing unit 208 selects the noise reduction parameter having a greater noise reduction effect than normal recorded in the memory 207.

Next, an example computation of the sharpness enhancement parameter will be described.

Sharpness enhancement is realized by extracting an edge signal from an image using a known technique, and adding the extracted edge signal to the original image after performing processing for enhancing the edge signal. A sharpness enhancement parameter having a standard edge enhancement effect and a sharpness enhancement parameter having a lower edge enhancement effect than the standard parameter are recorded in the memory 207 beforehand. Note that the sharpness enhancement parameter is recorded in the form of the amount of the gain applied to an edge signal.

If a face could not be detected in subject detection, the image processing unit 208 selects the standard sharpness enhancement parameter recorded in the memory 207. If a face could be detected in subject detection, the image processing unit 208 selects the sharpness enhancement parameter having a lower edge enhancement effect than normal recorded in the memory 207.

As mentioned above, by computing different image processing parameters in the case where a person (face) is and is not detected, image processing parameters that are more suitable for shooting a person can be computed in the case where a human detection (face detection) result is obtained at the time of shooting a person.

Note that although the present embodiment described examples in which human detection (face detection) is performed in subject detection, in the case where detection of other subjects is performed, a configuration for computing image processing parameters suitable for the individual subjects may be adopted.

The image processing unit 208 records image processing parameters thus computed from the current captured image (current image) in the memory 207 in order to be used in the processing of S105 or S111 that will be discussed later.

Next, in S103, the system control unit 218 detects the capturing condition of the image capturing apparatus 223. In the present embodiment, the system control unit 218 detects the presence or absence of firing of the flash 219 as the capturing condition. The subsequent processing is performed with a state where the flash 219 is fired as a capturing condition A and a state where the flash 219 is not fired as a capturing condition B.

Note that although detection of whether the flash 219 has been fired is performed as an example of a capturing condition in the present embodiment, the present invention is not limited thereto. For example, one or more of the following may be detected, including the type of flash 219, the type of firing (normal flash/high-speed sync flash), the use of bounce flash shooting, and the type of optical flash filter 220 (flash light diffusion filter, color temperature conversion filter, etc.). Also, one or more of the type of lens 200, the type of optical lens filter 221 (color temperature conversion filter, polarizing filter, etc.), and the value of the aperture 201 may be detected. Alternatively, a configuration may be adopted in which one or more pieces of information relating to ISO sensitivity, shutter speed, and camera orientation are detected.

There is no particular restriction in the number of capturing conditions, and the number of branches at S103 can be increased in the case where there are three or more capturing conditions.

In S104, the system control unit 218 computes the degree of similarity between the subject reference image for the capturing condition A (subject reference image A), and the current image using the image processing unit 208.

The subject reference image A will be described in detail here. In the present embodiment, the subject reference image A is a past (before the current image capture) image captured with flash firing, and denotes an image in which a person could be detected. The method of determining the subject reference image A from past captured images will be discussed later.

In the present embodiment, the most recent image capture in which a person could be detected, among past images captured with flash firing, serves as the subject reference image A at S104.

Next, an example method of computing the degree of similarity between the subject reference image A and the current image will be described.

The image processing unit 208 determines the degree of similarity between two images by comparing one or more of the following elements corresponding to the respective images.

Example elements for determining the degree of similarity include: luminance value measured by RGB metering sensor 214; RGB values of RGB metering sensor 214; average value for respective RGB data of captured image; average luminance value computed from RGB data of captured image; luminance histogram of captured image; RGB histogram of captured image; image capture time; ISO sensitivity at time of image capture; shutter speed at time of image capture; lens aperture at time of image capture; type of image capturing lens; focal length of lens at time of image capture; subject distance at time of image capture; type of flash at time of image capture; presence/absence of bounce flash firing of flash 219 at time of image capture; amount of firing of flash 219 at time of image capture; voltage when flash 219 is fired at time of image capture; and orientation of image capturing apparatus 223.

Here, the method of computing the respective elements will be described.

The luminance value measured by the RGB metering sensor 214 is expressed in simple terms by Equation 2.

$$\text{Luminance value of RGB metering sensor } 214 = 3 \times R + 6 \times G + B \quad (2)$$

In Equation 2, R, G and B are the respective R, G and B values of the RGB metering sensor 214.

The RGB values of the RGB metering sensor 214 is computed by the RGB metering sensor 214.

The luminance value of the RGB data of a captured image is expressed in simple terms by Equation 3.

$$\text{Luminance value of RGB data of captured image} = 3 \times R + 6 \times G + B \quad (3)$$

In Equation 3, R, G and B are the respective R, G and B average values for the entire captured image.

The luminance histogram of a captured image is computed by deriving the cumulative count number of the luminance values of each pixel computed from the 12-bit RGB data of the captured image. Note that the luminance value of each pixel is expressed in simple terms by Equation 4.

$$\text{Luminance value of each pixel used for histogram computation} = 3 \times R + 6 \times G + B \quad (4)$$

In Equation 4, R, G and B are the respective 12-bit R, G and B values of each pixel of the captured image after color interpolation.

The RGB histogram of a captured image is computed by counting the 12-bit RGB data of each pixel of a captured image for every value.

The image capture time is output by a timer included in the system control unit 218 in units of years, months, days, hours, minutes and seconds.

The ISO sensitivity at the time of image capture, the shutter speed at the time of image capture, and the lens aperture at the time of image capture are numerical values respectively controlled by the exposure control unit 210.

A model ID is assigned to the lens 200, and the system control unit 218 is able to determine the type (model) of the lens 200 as a result of model ID information being communicated from the lens 200 mounted on the image capturing apparatus 223 to the image capturing apparatus 223.

The focal length of the lens at the time of image capture is computed by the zoom control unit 212.

The subject distance at the time of image capture is computed by the focus-detecting control unit 211.

With regard to the type of flash at the time of image capture, a model ID is assigned for every flash similarly to the lens, and the type of flash is determined as a result of model ID information of the flash being communicated from the flash 219 mounted on the image capturing apparatus 223 to the image capturing apparatus 223.

The presence/absence of bounce flash firing of the flash 219 at the time of image capture, the amount of firing of the flash 219 at the time of image capture, and the voltage when the flash 219 is fired at the time of image capture are determined as a result of the flash 219 communicating the state at the time of firing to the image capturing apparatus 223.

The orientation of the image capturing apparatus 223 is orientation information of the image capturing apparatus 223 detected by the orientation detection sensor 216.

The subject reference image A and the current image are compared with an element for determining the degree of similarity thus computed, and the results of comparison with one or more elements are integrated to ultimately obtain one degree of similarity.

With regard to the degree of similarity between the luminance histograms of captured images or the RGB histograms of captured images, the degree of similarity is set to approach 100% the closer shapes of the histograms of the two images being compared, and to revert to 0% the further away the two shapes are. Degrees of similarity between 100% and 0% are computed by linear interpolation, for example.

With regard to the image capture time, the degree of similarity is set to approach 100% the closer the times of the two images, and to revert to 0% the further apart the times of the two images. Degrees of similarity between 100% and 0% are computed by linear interpolation, for example.

With regard to the type of image capturing lens, the type of image capturing flash, the presence/absence of bounce flash firing of the flash 219, and the orientation of the image capturing apparatus 223, it is determined whether the states of the respective elements are the same for the two images, with the degree of similarity being 100% if the same and 0% if different.

With regard to the remaining elements, the degree of similarity is set to approach 100% the closer the values and to approach 0% the further apart the values. Degrees of similarity between 100% and 0% are computed by linear interpolation, for example.

Note that in the present embodiment, since the presence/absence of firing of the flash 219 is determined at S103, and this processing is performed for every capturing condition, the degree of similarity computation according to the presence/absence of firing of the flash 219 is not performed. However, in the case where capturing conditions other than the presence/absence of firing of the flash 219 are determined in capturing condition detection, the presence/absence of firing of the flash 219 at the time of image capture may be included as one of the elements for determining the degree of similarity of step 104.

Note that in the case where a person was not detected in a past image captured with flash firing or where a person was not detected in the current captured image, the degree of similarity will be 0%.

Next, the image processing unit 208, using Equation 5 and Equation 6, performs weighted addition of the image processing parameter (first parameter) computed from the subject reference image A and the image processing parameter (second parameter) computed from the current image in S105. The image processing unit 208 then sets the weighted addition result as a new image processing parameter α (third parameter).

$$\alpha = SpRef\_A\_Param \times SpRef\_A\_Wt + CurrentParam \times (1 - SpRef\_A\_Wt) \quad (5)$$

Here,

α = new image processing parameter after weighted addition;

SpRef_A_Param = image processing parameter of subject reference image A;

CurrentParam = image processing parameter of current image; and

SpRef_A_Wt = weight of image processing parameter of subject reference image A (0-1).

SpRef_A_Wt is given by Equation 6.

$$SpRef\_A\_Wt = (SpRef\_A\_Reliability - CurrentReliability) \times SpRef\_A\_Similarity \quad (6)$$

However, if SpRef_A_Wt<0, then SpRef_A_Wt=0.

Here,

SpRef_A_Reliability = subject reliability of subject reference image A (0-1);

CurrentReliability = subject reliability of current image (0-1); and

SpRef_A_Similarity = degree of similarity between subject reference image A and current image computed at S104 (0-1).

Weighted addition using Equation 5 and Equation 6 can be illustrated with the following (1) to (3):

(1) The image processing parameter of the image with respect to which the degree of reliability of the detected subject is higher, out of the subject reference image A and the current image, can be used.

(2) If the degree of the reliability of the subject of the current image is higher, out of the subject reference image A and the current image, the correction value of the current image can be used.

(3) Even if the degree of the reliability of the subject of the subject reference image A is higher than the degree of the reliability of the subject of the current image, the image processing parameter of the subject reference image A is not prioritized in the case where the degree of similarity between the two images is low.

Computation of image processing parameters using Equation 5 and Equation 6 is performed separately for each of white balance correction, brightness correction, contrast correction, color correction, noise reduction, and sharpness enhancement.

Specifically, in the case of the R correction value of the parameter for white balance correction, the operation is performed after substituting the respective R correction values of the subject reference image A and the current image for the image processing parameters in Equation 5. The same applies to the G correction value and the B correction value.

In the case of brightness correction, the operation is performed after substituting the respective brightness correction gains of the subject reference image A and the current image for the image processing parameters of Equation 5 and Equation 6.

In the case of contrast correction, the operation is performed after substituting the output values corresponding to the input values of the respective contrast correction gamma curves of the subject reference image A and the current image for the image processing parameters of Equation 5 and Equation 6.

In the case of color correction, the operation is performed after substituting the grid point values of the output R corresponding to the input R of the respective 3D LUTs of the subject reference image A and the current image for the image processing parameters of Equation 5 and Equation 6. The same applies to G and B.

In the case of noise reduction, the operation is performed after substituting the pixel count N of pixels on the left, right, above and below the respective pixels of interest of the subject reference image A and the current image for the image processing parameters of Equation 5 and Equation 6.

In the case of sharpness enhancement, the operation is performed after substituting the amount of gain applied to the respective edge signals of the subject reference image A and the current image for the image processing parameters of Equation 5 and Equation 6.

Next, in S106, the image processing unit 208 computes the degree of similarity between the normal reference image for the capturing condition A (normal reference image A), and the current image.

The normal reference image A will be described in detail here. In the present embodiment, "normal reference image A" denotes an image determined in accordance with a method of determining a reference image that is not dependent on the subject detection result, from among past (before the current image capture) captured images that were captured with flash firing. The method of determining of this normal reference image A (S109) will be discussed in detail later.

Next, the method of computing the degree of similarity between the normal reference image A and the current image will be described.

The degree of similarity between the two images (normal reference image A and current image) is determined by comparing the above-mentioned elements corresponding to the respective images using a similar method to S104.

Next, in S107, the image processing unit 208 computes the image processing parameter to be applied to the current image, by performing weighted addition of the image processing parameter (fourth parameter) computed from the normal reference image A and the image processing parameter $\alpha$ computed at S105, according to the degree of similarity. An example weighted addition is shown in Equation 7.

$$\text{FinalParam} = \text{NormRef\_A\_Param} \times \text{NormRef\_A\_Similarity} + \alpha \times (1 - \text{NormRef\_A\_Similarity}) \quad (7)$$

Here,

FinalParam=image processing parameter applied to current image;

NormRef_A_Param=image processing parameter of normal reference image A;

$\alpha$=image processing parameter $\alpha$ computed using Equation 5 of S105; and NormRef_A_Similarity=degree of similarity between normal reference image A and current image computed at S106 (0-1).

Calculation of image processing parameters using Equation 7 is performed separately for the respective parameters of white balance correction, brightness correction, contrast correction, color correction, noise reduction, and sharpness enhancement, similarly to Equation 5 and Equation 6 of S105.

Since the respective specific computations can be performed using a similar method to Equation 5 and Equation 6 of S105, description thereof will be omitted.

In S108, the image processing unit 208 performs updating of the subject reference image A for use in the next image capture. This processing involves determining whether to update the subject reference image A with the image captured this time.

Condition for Updating Subject Reference Image A

In the present embodiment, the subject reference image A is updated in the case where the following updating condition is satisfied:

subject reliability (person reliability) of current subject reference image $A \leq$ subject reliability (person reliability) of current image In the case where, however, a subject (person) could not be detected in the current image, subject reliability will be 0%. Thus, if the degree of the reliability of the subject detected in the current image is greater than or equal to the subject reliability of the subject reference image A targeted for updating, the current image is set as the new subject reference image A (subject reference image A stored in memory 207 is updated with the current image).

Here, the contents to be updated include the elements for determining the degree of similarity described in the degree of similarity determination of S104 and S106, and the image processing parameters relating to white balance correction, brightness correction, contrast correction, color correction, noise reduction, and sharpness enhancement that were computed from the current image at S102.

All of this information is recorded in the memory 207 in preparation for being read out at the next image capture.

Next, in S109, updating of the normal reference image A is performed. This processing involves determining whether to use the image captured this time as the normal reference image A in the processing of S104 and S105 performed on the image captured next time.

Condition for Updating Normal Reference Image A

In the present embodiment, the normal reference image A is updated in the case where the following condition is satisfied:

degree of similarity computed at $S106 \leq N\%$

N can be an arbitrary numerical value from 0% to 100%, and is 20% in the present embodiment. That is, in the case where the degree of similarity between the current image and the normal reference image A is less than or equal to a predetermined degree of similarity ($\leq 20\%$), the current image is set as the new normal reference image A (normal reference image A stored in memory 207 is updated with the current image).

Updating of the normal reference image A involves updating the following information:

elements for determining the degree of similarity described in the degree of similarity determination of S106 and S107; and image processing parameters relating to white balance correction, brightness correction, contrast correction, color correction, noise reduction, and sharpness enhancement that are applied to the current image computed at S107.

This information is recorded in the memory 207 as information on the normal reference image A, in order to be used in processing on the next captured image.

Returning to description of S103, processing in the case where the capturing condition B is detected in capturing condition detection (in the present embodiment, processing in the case of image capture without flash firing) will be described.

Since the processing of S110 to S115 performed in the case of the capturing condition B and the processing of S104 to S109 performed in the case of the capturing condition A are the same except for the subject reference image A and the normal reference image A being replaced by a subject reference image B and a normal reference image B, a detailed description thereof will be omitted.

In S116, the image processing unit 208 applies a developing process using the image processing parameter calculated at S107 or S113 to the current image.

Next, the effects of the present embodiment will be described.

Figure 3:
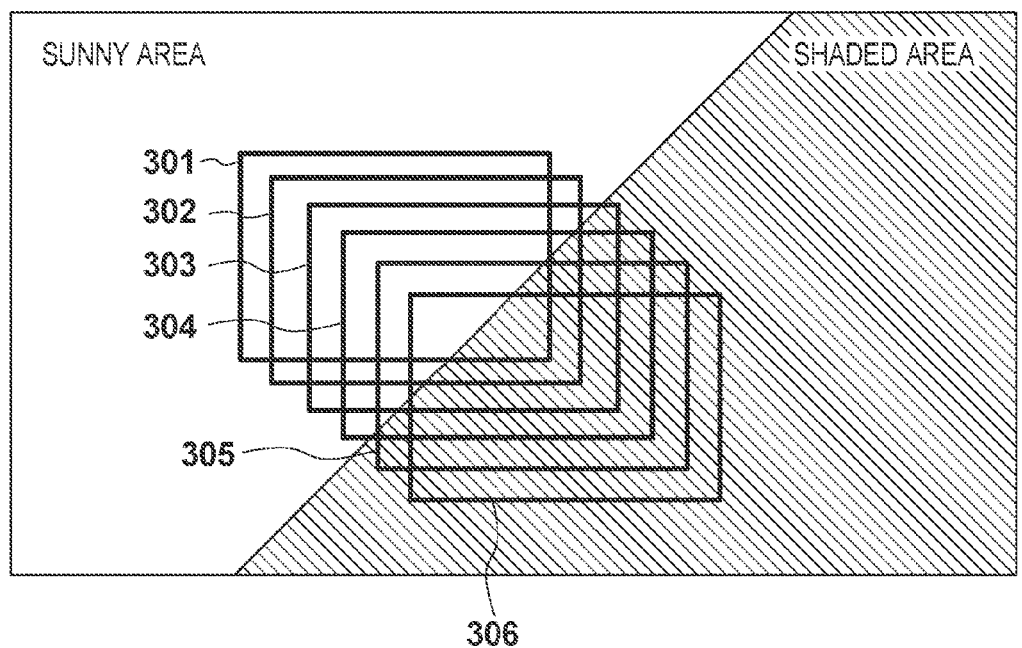
FIG. 3 is a diagram illustrating an example in the case where capturing conditions change gradually.

It is assumed that continuous shooting such as described with reference to FIG. 3 is performed, the first to sixth frames 301 to 306 are all captured without flash firing, and a person (face) could not be detected in any of the captured images. Further, it is assumed that the degrees of similarity of the captured images of the second frame, the third frame, the fourth frame and the fifth frame to the captured image of the first frame 301 is 100%, 80%, 60%, 40%, and 20%, respectively.

Also, examples of various parameters relating to the captured images of the first to sixth frames 301 to 306 are shown in FIG. 5. Note that in the example of FIG. 3, as mentioned above, since there is little change in the image capturing area between each frame, there will be a high degree of similarity between the image of the previous frame and the current image, and the method of Literature 1 will result in the same image processing parameters as the first frame being applied in all the images from the second to sixth frames.

First, a specific operation at the time of applying the processing of FIG. 1 to the image of the first frame 301 will be described.

Since there are no people in the image, a person could not be detected at S101.

At S102, image processing parameters are computed from the current image (first frame 301). Here, it is assumed that the white balance correction values (gain applied to each color signal) computed only from the image of the first frame 301 are as follows, for example.

White balance correction values computed only from the current image:

Rgain=×2.0
Ggain=×1.0
Bgain=×2.0

At S103, since the flash is not fired at the time of image capture, it is determined that the capturing condition is the capturing condition B.

At S110, since a subject (person) could not be detected, the degree of similarity between the subject reference image B and the current image will be 0%.

At S111, since the degree of similarity computed at S110 is 0%, the image processing parameter α after weighted addition will, from Equation 5 and Equation 6, be the parameter computed from the current image (first frame 301) at S102.

At S112, since the image capture of the first frame is being processed and there is no normal reference image B, the degree of similarity between the normal reference image B and the current image (first frame 301) will be 0%.

At S113, the image processing parameter applied to the current image (first frame 301) will be the image processing parameter α (i.e., image processing parameter computed only from the image of first frame 301) from Equation 7. Giving the white balance correction values as an example, the white balance correction values applied to the current image (first frame 301) will be as follows.

White balance correction values applied to the current image:
Rgain=×2.0
Ggain=×1.0
Bgain=×2.0

At S114, since a subject (person) could not be detected, updating of the subject reference image B is not performed.

At S115, since the degree of similarity is 0%, updating is performed such that the current image (first frame 301) is used as the normal reference image B.

Next, the processing on the second frame 302 will be described.

Since there are no people in the image, a person could not be detected at S101.

At S102, image processing parameters are computed from the current image (second frame 302). Here, it is assumed that the white balance correction values computed only from the image of the second frame 302 are as follows, for example.

White balance correction values computed only from the current image:

Rgain=×2.2
Ggain=×1.0
Bgain=×1.8

At S103, since the flash is not fired at the time of image capture, it is determined that the capturing condition is the capturing condition B.

At S110, since a subject (person) could not be detected, the degree of similarity between the subject reference image B and the current image will be 0%.

At S111, since the degree of similarity computed at S110 is 0%, the image processing parameter α after weighted addition will, from Equation 5 and Equation 6, be the parameter computed from the current image at S102.

At S112, the degree of similarity between the normal reference image B (first frame 301) and the current image is computed to be 100%.

At S113, 100% of the image processing parameter applied to the normal reference image B (first frame 301) will, from Equation 7, be used for the image processing parameter applied to the current image (second frame 302). Giving the white balance correction values as an example, the white balance correction values applied to the current image (second frame 302) were as follows.

White balance correction values applied to the current image:
Rgain=×2.0
Ggain=×1.0
Bgain=×2.0

At S114, since a subject (person) could not be detected, updating of the subject reference image B is not performed.

At S115, since the degree of similarity is 100%, updating of the normal reference image B is not performed.

Next, processing on the image of the third frame 303 will be described.

Since there are no people in the image, a person could not be detected at S101.

At S102, image processing parameters are computed from the current image (third frame 303). Here, it is assumed that the white balance correction values (gain applied to each color signal) computed only from the image of the third frame 303 are as follows, for example.

White balance correction values computed only from the current image:
Rgain=×2.4
Ggain=×1.0
Bgain=×1.6

At S103, since the flash is not fired at the time of image capture, it is determined that the capturing condition is the capturing condition B.

At S110, since a subject (person) could not be detected, the degree of similarity between the subject reference image B and the current image will be 0%.

At S111, since the degree of similarity computed at S110 is 0%, the image processing parameter α after weighted addition will, from Equation 5 and Equation 6, be the parameter computed from the current image at S102.

At S112, the degree of similarity between the normal reference image B (first frame 301) and the current image is computed to be 80%.

At S113, the image processing parameter applied to the current image (third frame 303) will, from Equation 7, be obtained by performing weighted addition of 80% of the image processing parameter applied to the normal reference image B (first frame 301) and 20% of the image processing parameter computed from the current image. Giving the white balance correction values as an example, the white balance correction values applied to the current image (third frame 303) will be as follows.

White balance correction values applied to the current image:
Rgain=2.0×0.8+2.4×0.2=×2.1
Ggain=1.0×0.8+1.0×0.2=×1.0
Bgain=2.0×0.8+1.6×0.2=×1.9

At S114, since a subject (person) could not be detected, updating of the subject reference image B is not performed.

At S115, since the degree of similarity is 80%, updating of the normal reference image B is not performed.

Since processing on the fourth and fifth frames 304 to 305 is similar to the second frame, description thereof will be omitted and processing on the sixth frame 306 will be described.

Since there are no people in the image, a person could not be detected at S101.

At S102, image processing parameters are computed from the current image (sixth frame 306). Here, it is assumed that the white balance correction values computed only from the image of the sixth frame 306 are as follows, for example.

White balance correction values computed only from the current image:
Rgain=×3.0
Ggain=×1.0
Bgain=×1.0

At S103, since the flash is not fired at the time of image capture, it is determined that the capturing condition is the capturing condition B.

At S110, since a subject (person) could not be detected, the degree of similarity between the subject reference image B and the current image will be 0%.

At S111, since the degree of similarity computed at S110 is 0%, the image processing parameter α after weighted addition will, from Equation 5 and Equation 6, be the parameter computed from the current image at S102.

At S112, the degree of similarity between the normal reference image B (image of first frame 301) and the current image is computed to be 20%.

At S113, the image processing parameter applied to the current image (sixth frame 306) will, from Equation 7, be obtained by weighted addition of 20% of the image processing parameter applied to the normal reference image B (first frame 301) and 80% of the image processing parameter computed from the current image (sixth frame 306). Giving the white balance correction values as an example, the white balance correction values applied to the current image (sixth frame 306) will be as follows.

White balance correction values applied to the current image:
Rgain=2.0×0.2+3.0×0.8=×2.8
Ggain=1.0×0.2+1.0×0.8=×1.0
Bgain=2.0×0.2+1.0×0.8=×1.2

At S114, since a subject (person) could not be detected, updating of the subject reference image B is not performed.

At S115, since the degree of similarity is 20%, updating is performed such that the current image (sixth frame 306) will be the new normal reference image B.

Since the processing of each image in the FIG. 3 scene is performed in the above manner, values approaching image processing parameters used for the first frame 301 are computed the higher degree of similarity of an image with the image of the first frame 301, enabling image variation in a similar scene due to a change in image processing parameters to be reduced.

On the other hand, when the image capturing area changes gradually, reducing the degree of similarity with the image of the first frame, image processing parameters approaching the image processing parameters computed from the current image are used. Thus, even in the case where the image capturing area gradually changes from a sunny area to a shaded area as in the FIG. 3 scene, image processing parameters corresponding to the change in the image capturing area are computed. Accordingly, even in the case where the first frame is a sunny area and the sixth frame is a shaded area, image processing parameters suited to the respective environments are computed. Thus, the present embodiment enables both reduction in variation of image processing parameters in a similar scene and computation of appropriate image processing parameters in the case where the subject environment changes to be supported.

Another effect of the present embodiment will be described next with reference to FIG. 4.

Figure 4A:
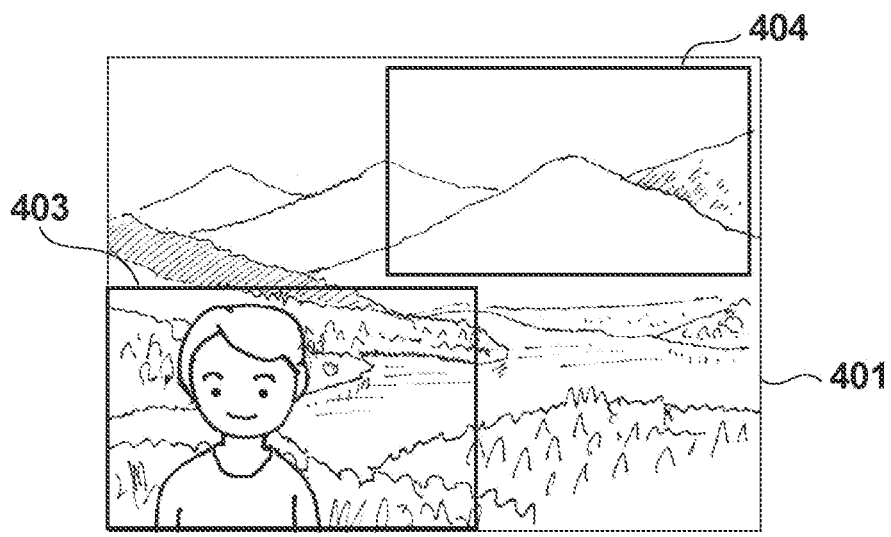
FIG. 4A and FIG. 4B are diagrams illustrating an example in the case where there is a significant change in image capturing area.
Figure 4B:
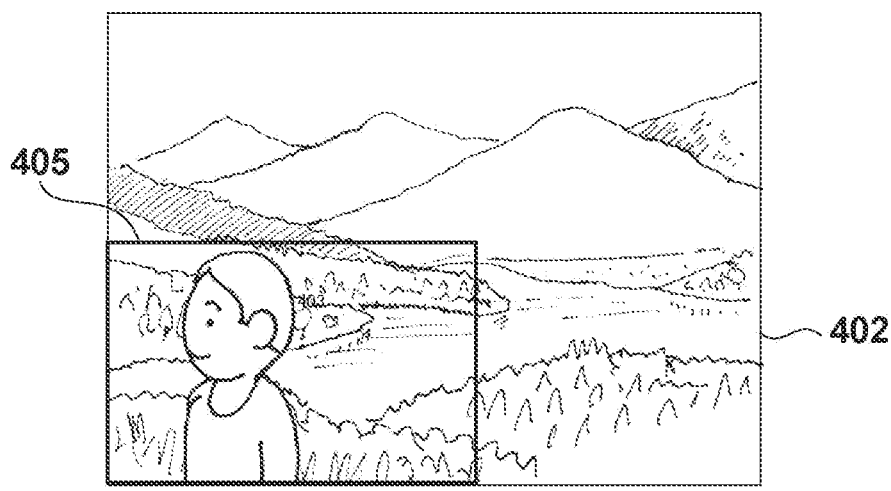

It is assumed that continuous shooting such as described with reference to FIG. 4 is performed, and the first to third frames 403 to 405 are all captured without flash firing. Also, it is assumed that the degree of similarity between the images of the first frame 403 and the second frame 404 is 0%, the degree of similarity between the images of the first frame 403 and the third frame 405 is 100%, and the degree of similarity between the images of the second frame 404 and the third frame 405 is 0%. Further, it is assumed that the detected person reliability in the first frame 403 is 100%, and that in the second frame 404 and the third frame 405, person reliability is 0% since a person is not detected.

FIG. 6 shows an example of the various parameters, similarly to FIG. 5, for the captured images of the first to third frames 403 to 405. In the example of FIG. 4, there is a significant change in the image capturing area between each frame, and a low degree of similarity between the image of the previous frame and the current image (0%). In such a case, the method of Literature 1 results in only image processing parameters computed only from the current image in each frame being applied. As a result, even if the first frame 403 and the third frame 405 are the same image capturing area (or 100% degree of similarity), different image processing parameters will end up being applied in the first frame 403 in which a person was detected and the third frame 405 in which a person was not detected.

First, a specific operation when the processing of FIG. 1 is applied to the image of the first frame 403 will be described.

At S101, since the person is facing the front, a subject (person) is detected.

At S102, image processing parameters in the case where a subject was detected are computed from the current image. That is, image processing parameters are computed so as to satisfy a characteristic predetermined according to the detected subject.

Giving the white balance correction values as an example, it is assumed that the white balance correction values computed only from the current image (first frame 403) are as follows. It is also assumed that these white balance correction values were computed as a result of utilizing information on the person detected at S102.
White balance correction values computed only from the current image:
Rgain=×2.0
Ggain=×1.0
Bgain=×2.0

At S103, since the flash is not fired at the time of image capture, it is determined that the capturing condition is the capturing condition B.

At S110, since image capture of the first frame is being processed and there is no subject reference image B, the degree of similarity between the subject reference image B and the current image (first frame 403) will be 0%.

At S111, since the degree of similarity computed at S110 is 0%, the image processing parameter α after weighted addition will, from Equation 5 and Equation 6, be the parameter computed from the current image (first frame 403) at S102.

At S112, since image capture of the first frame is being processed and there is no a normal reference image B, the degree of similarity between the normal reference image B and the current image (first frame 403) will be 0%.

At S113, the image processing parameter applied to the current image (first frame 403) will, from Equation 7, be the image processing parameter α (i.e., image processing parameter computed only from the image of first frame 403). Giving the white balance correction values as an example, it is assumed that the white balance correction values applied to the current image (first frame 403) were as follows.
White balance correction values applied to the current image:
Rgain=×2.0
Ggain=×1.0
Bgain=×2.0

At S114, since degree of reliability of the detected subject (person) is 100%, updating is performed such that the current image (first frame 403) is the new subject reference image B.

At S115, since the degree of similarity is 0%, updating is performed such that the current image (first frame 403) is the new normal reference image B.

Next, the processing on the second frame 404 will be described.

Since there are no people in the image, a person could not be detected at S101.

At S102, image processing parameters are computed from the current image (second frame 404). Here, it is assumed that the white balance correction values computed only from the image of the second frame 404 were as follows, for example.
White balance correction values computed only from the current image:
Rgain=×2.4
Ggain=×1.0
Bgain=×1.6

At S103, since the flash is not fired at the time of image capture, it is determined that the capturing condition is the capturing condition B.

At S110, since a subject (person) could not be detected, the degree of similarity between the subject reference image B and the current image (second frame 404) will be 0%.

At S111, since the degree of similarity computed at S110 is 0%, the image processing parameter α after weighted addition will, from Equation 5 and Equation 6, be the parameter computed from the current image (second frame 404) at S102.

At S112, the degree of similarity between the normal reference image B (first frame 403) and the current image (second frame 404) will be 0%.

At S113, the image processing parameter applied to the current image (second frame 404) will, from Equation 7, be the image processing parameter α (i.e., image processing parameter computed only from the image of second frame 404). Giving the white balance correction values as an example, it is assumed that the white balance correction values applied to the current image (second frame 403) were as follows.
White balance correction values applied to the current image:
Rgain=×2.4
Ggain=×1.0
Bgain=×1.6

At S114, since a subject (person) could not be detected, updating of the subject reference image B is not performed.

At S115, since the degree of similarity is 0%, updating is performed such that current image (second frame 404) is the new normal reference image B.

Next, the processing on the third frame 405 will be described.

Although the person appears in the third frame 405, a subject (person) could not be detected at S101, since he is turned to the side.

At S102, image processing parameters in the case where a person is not detected are computed from the current image. Giving the white balance correction values as the example, it is assumed that the white balance correction values computed only from the current image (third frame 405) were as follows.

White balance correction values computed only from the current image:
Rgain=×1.6
Ggain=×1.0
Bgain=×2.4

Here, since a subject (person) was detected at S101 in the first frame 403, white balance correction values suited to the subject were computed. However, since a person could not be detected at S101 in the third frame 405, the computed white balance correction values differ, despite the image capturing area being the same as the first frame 403.

At S103, since the flash is not fired at the time of image capture, it is determined that the capturing condition is the capturing condition B.

At S110, although a subject (person) could not be detected, the degree of similarity between the subject reference image B and the current image (third frame 405) will be 100%, since the difference is between whether the person is turned to the side or facing the front.

At S111, since the degree of similarity computed at S110 is 100%, the image processing parameter α after weighted addition will, from Equation 5 and Equation 6, take a value that reflects 100% of the image processing parameter of the subject reference image B (i.e., first frame 403). That is, giving the white balance correction values as an example, the white balance correction values applied to the current image (third frame 405) will be as follows.
White balance correction values applied to the current image:
Rgain=×2.0
Ggain=×1.0
Bgain=×2.0

At S112, the degree of similarity between the normal reference image B (second frame 404) and the current image (third frame 405) will be 0%.

At S113, the image processing parameter applied to the current image (third frame 405) will, from Equation 7, be the image processing parameter α (i.e., image processing parameter applied to first frame 403).

At S114, since a subject (person) could not be detected, updating of the subject reference image B is not performed.

At S115, since the degree of similarity is 0%, updating is performed such that the current image (third frame 405) is the new normal reference image B.

Since processing of each frame shown in FIG. 4 is performed in the above manner, even if a person is not detected in the third frame 405, similar image processing parameters to the first frame 403 are applied, based on the degree of similarity with the first frame 403 in which a person was detected. Thus, even if a subject is not detected, image processing parameters are determined taking into consideration the degree of similarity with an image in which a subject was detected, enabling variation in developing results with an image in which a subject could be correctly detected to be suppressed even in the case where subject detection fails.

OTHER EMBODIMENTS

Note that in the above-mentioned embodiments, the correction of a plurality of images captured continuously was described. "Continuous shooting" here denotes image capture in time series, and there is no particular restriction on the image capture interval. In other words, "continuous shooting" referred to in the present specification is not limited to continuous shooting in a short time span such as with image capture in continuous shooting mode or auto bracket mode. Also, the image capture interval of images captured continuously need not be equal.

Also, although the case of there being a plurality of capturing conditions was described in the above-mentioned embodiments, the effect of the present invention can be realized even in the case where there is a single capturing condition. Accordingly, it is not essential in the present invention to use processing for every capturing condition. For example, in the case where image capture without flash illumination is set as a condition, the processing of S103 and S110 to S115 in FIG. 1 is unnecessary.

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273017, filed on Dec. 7, 2010, that is hereby incorporated by reference herein its entirety.

What is claimed is:

1. An image processing apparatus for computing a parameter to be used in image processing applied to each of a plurality of images captured in time series, comprising:
a parameter computation processor that computes a parameter for each of the plurality of images based on information obtained from the image;
a detection processor that detects a predetermined subject from an image;
a storage unit that stores a subject reference image determined from at least one image in which the predetermined subject is detected and a normal reference image determined from at least one image in which the predetermined subject is not detected, out of images captured before an image targeted for processing, to which image processing is applied;
a similarity computation processor that computes a degree of similarity between the image targeted for processing and the normal reference image, from a predetermined feature obtained from the respective images; and
a control processor that computes a parameter to be used in image processing applied to the image targeted for processing, by performing weighted addition using (1) a parameter computed from the image targeted for processing by said parameter computation processor, (2) a parameter computed from the subject reference image by said parameter computation processor, (3) a parameter computed from the normal reference image, by said parameter computation processor, based on a result of the detection of the predetermined subject from the image targeted for processing by a detection processor and the degree of similarity,
wherein the storage unit stores the image targeted for processing as a new subject reference image in a case where the predetermined subject is detected from the image targeted for processing and the degree of similarity is more than a predetermined degree of similarity, and stores the image targeted for processing serves as a new normal reference image in a case where the degree of similarity is less than or equal to a predetermined degree of similarity.

2. An image capturing apparatus comprising:
a camera that captures an image;
the image processing apparatus according to claim 1 that computes a parameter to be used in image processing applied to each of a plurality of images captured in time series by the camera; and
an image processing processor that applies image processing using the parameter to an image targeted for processing.

3. A control method for an image processing apparatus that computes a parameter to be used in image processing applied to each of a plurality of images captured in time series, comprising:
a parameter computation step of computing a parameter for each of the plurality of images based on information obtained from the image;
a detection step of detecting a predetermined subject from an image;
a storage step of storing a subject reference image determined from at least one image in which the predetermined subject is detected and a normal reference image determined from at least one image in which the predetermined subject is not detected, out of images captured before the image targeted for processing, to which image processing is applied, into a storage unit;
a similarity computation step of computing a degree of similarity between the image targeted for processing and the normal reference image, from a predetermined feature obtained from the respective images;
a control step of computing a parameter to be used in image processing applied to the image targeted for processing, by performing weighted addition using (1) a parameter computed from the image targeted for processing in said parameter computation step, (2) a parameter computed from the subject reference image in said parameter computation step, and (3) a parameter computed from the normal reference image in said parameter computational step, based on a result of the detection of the predetermined subject from the image targeted for processing in the detection step and the degree of similarity; and
a step of storing the image targeted for processing as a new subject reference image in a case where the predetermined subject is detected from the image targeted for processing and the degree of similarity is more than a predetermined degree of similarity, and storing the image targeted for processing as a new normal reference image in a case where the degree of similarity is less than or equal to a predetermined degree of similarity.

4. A non-transitory computer-readable storage medium having recorded thereon a program for causing a computer to function as the processors and the storage unit of the image processing apparatus according to claim 1.

* * * * *